United States Patent
Cusati

[19]

[11] Patent Number: 6,094,951
[45] Date of Patent: Aug. 1, 2000

[54] STEERING COLUMN LOCKING AND TORQUE LIMITING BEARING SUPPORT SLEEVE

[75] Inventor: Ward R. Cusati, Burlington, Conn.

[73] Assignee: The Torrington Company, Torrington, Conn.

[21] Appl. No.: 09/139,199

[22] Filed: Aug. 25, 1998

Related U.S. Application Data

[63] Continuation-in-part of application No. 08/807,302, Feb. 27, 1997.

[51] Int. Cl.$^7$ .................................................... B60R 25/02
[52] U.S. Cl. ................................ 70/189; 70/184; 464/179
[58] Field of Search .............................. 70/182, 185, 183, 70/184, 186, 252, 189; 464/30, 179, 162

[56] References Cited

U.S. PATENT DOCUMENTS

| | | | |
|---|---|---|---|
| 3,187,527 | 6/1965 | Moss et al. ................................ | 70/252 |
| 3,557,633 | 1/1971 | Frerichs .................................... | 464/162 |
| 3,566,634 | 3/1971 | Borck ....................................... | 70/252 |
| 4,348,874 | 9/1982 | Müller et al. ............................ | 464/162 |
| 4,606,426 | 8/1986 | de la Orden Azuagia .............. | 180/287 |
| 4,738,154 | 4/1988 | Hancock ................................... | 70/252 |
| 4,750,380 | 6/1988 | Hoblingri et al. ........................ | 70/185 |
| 4,854,141 | 8/1989 | Haldric et al. ............................ | 70/182 |
| 5,230,658 | 7/1993 | Burton ..................................... | 464/162 |
| 5,718,131 | 2/1998 | Bobbitt, III .............................. | 70/186 |
| 5,830,071 | 11/1998 | Castellon ................................ | 464/162 |

FOREIGN PATENT DOCUMENTS

| | | | |
|---|---|---|---|
| 0035415 | 9/1981 | European Pat. Off. ................. | 70/182 |
| 2627443 | 8/1989 | France .................................... | 70/182 |
| 2637339 | 2/1978 | Germany ................................ | 70/189 |

*Primary Examiner*—Darnell M. Boucher
*Attorney, Agent, or Firm*—Robert F. Palermo

[57] ABSTRACT

A locking mechanism for a steering column shaft in a steering column housing of a vehicle, includes a smooth bore hollow cylindrical sleeve member overlying a smooth surface steering column shaft. A longitudinal locking slot in an outer surface of the cylindrical sleeve member is engagable with a locking pin member operated by an ignition switch on the steering column housing. Torque transmitted from the steering column shaft to the sleeve member is limited by a bushing member interposed between the steering column shaft and the sleeve member. The sleeve member is supported in the inner race of a steering column bearing mounted in the housing.

9 Claims, 4 Drawing Sheets

STEERING COLUMN LOCKING AND TORQUE LIMITING BEARING SUPPORT SLEEVE

CROSS REFERENCE TO RELATED APPLICATIONS

This is a continuation-in-part of copending U.S. patent application Ser. No. 08/807,302, filed on Feb. 27, 1997 by Ward R. Cusati, and assigned to The Torrington Company, the assignee of the present invention. The contents of the copending application are incorporated herein by reference.

BACKGROUND OF THE INVENTION

This invention relates generally to steering column locking devices and more particularly to multi-functional steering column locks having bearing support and torque limiting features.

Anti-theft steering column locks have been included on automobiles for many years, and they have certainly prevented many auto thefts. However, in many cases, although the thief failed to steal the automobile, he frequently did serious and expensive damage to the automobile in his failed attempt.

One common form of damage has been breakage of the steering column and its related components while trying to force the column to turn despite its being locked. In addition to the inconvenience of having one's automobile disabled, there is also the expense of repair which is normally borne by the automobile owner and his insurer.

It is possible, by employing shear pins and other frangible coupling members, to control the location of the damage and to thereby limit the damage expense. However, such measures still result in a disabled automobile and the necessity for repairs of varying cost and complexity as well as the associated delays.

The foregoing illustrates limitations known to exist in present steering column locking mechanisms. Thus, it would clearly be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by an apparatus for locking a steering column shaft rotatably mounted in a steering column housing, the apparatus comprising a hollow cylindrical sleeve member overlying the steering column shaft; a longitudinal slot in an outer surface of the cylindrical sleeve member for receiving a locking pin member from said steering column housing; and means for frictionally coupling said cylindrical sleeve member and said steering column shaft and for limiting torque transmitted from the steering column shaft to the sleeve member.

The foregoing and other aspects will become apparent from the following detailed description of the invention when considered in conjunction with the accompanying drawings.

DETAILED DESCRIPTION

Figure 1:
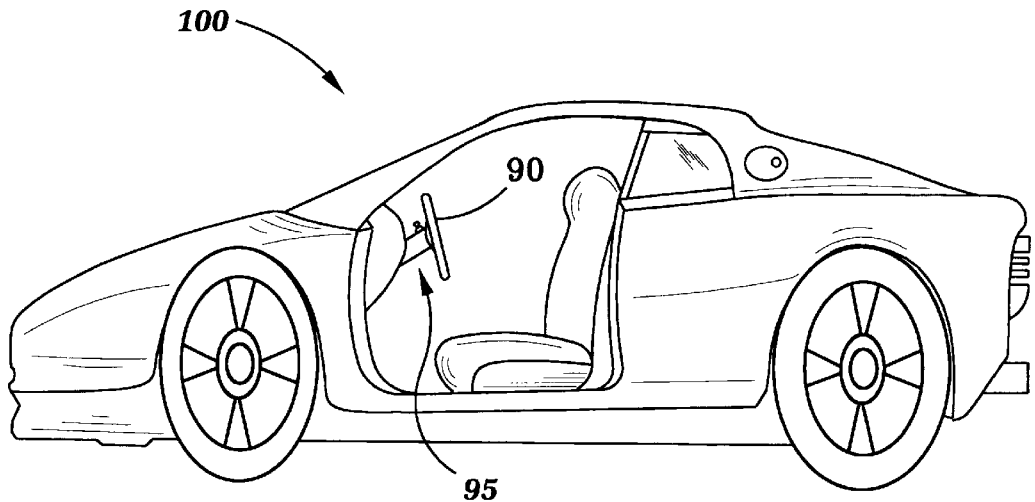
FIG. 1 is a partially cut-away schematic view of a vehicle having a steering column which incorporates the locking and torque limiting device of the invention.
Figure 2:
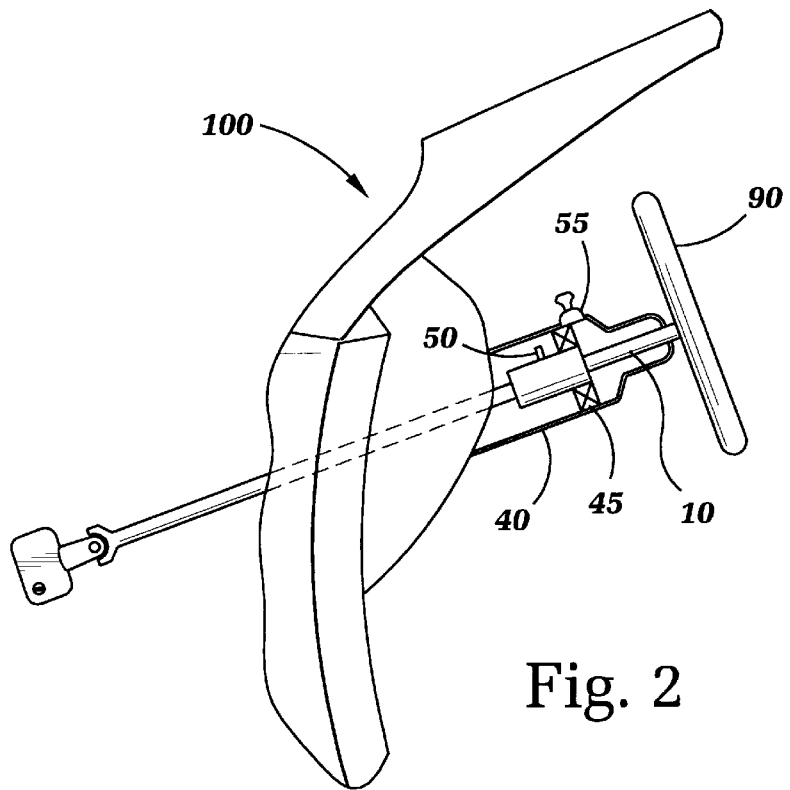
FIG. 2 is a fragmentary schematic view of a steering column showing the general operating environment of the invention.

The steering column locking mechanism is illustrated in FIGS. 1 through 6. In FIGS. 1 and 2 a vehicle 100 is shown in a cut-away view to show a steering column assembly 95 with a steering wheel 90 mounted on a steering column shaft 10. The steering column shaft is rotatably supported in a steering column housing 40 and extends from the steering wheel to an appropriate joint which connects to a steering gear box in a known manner.

Figure 3:
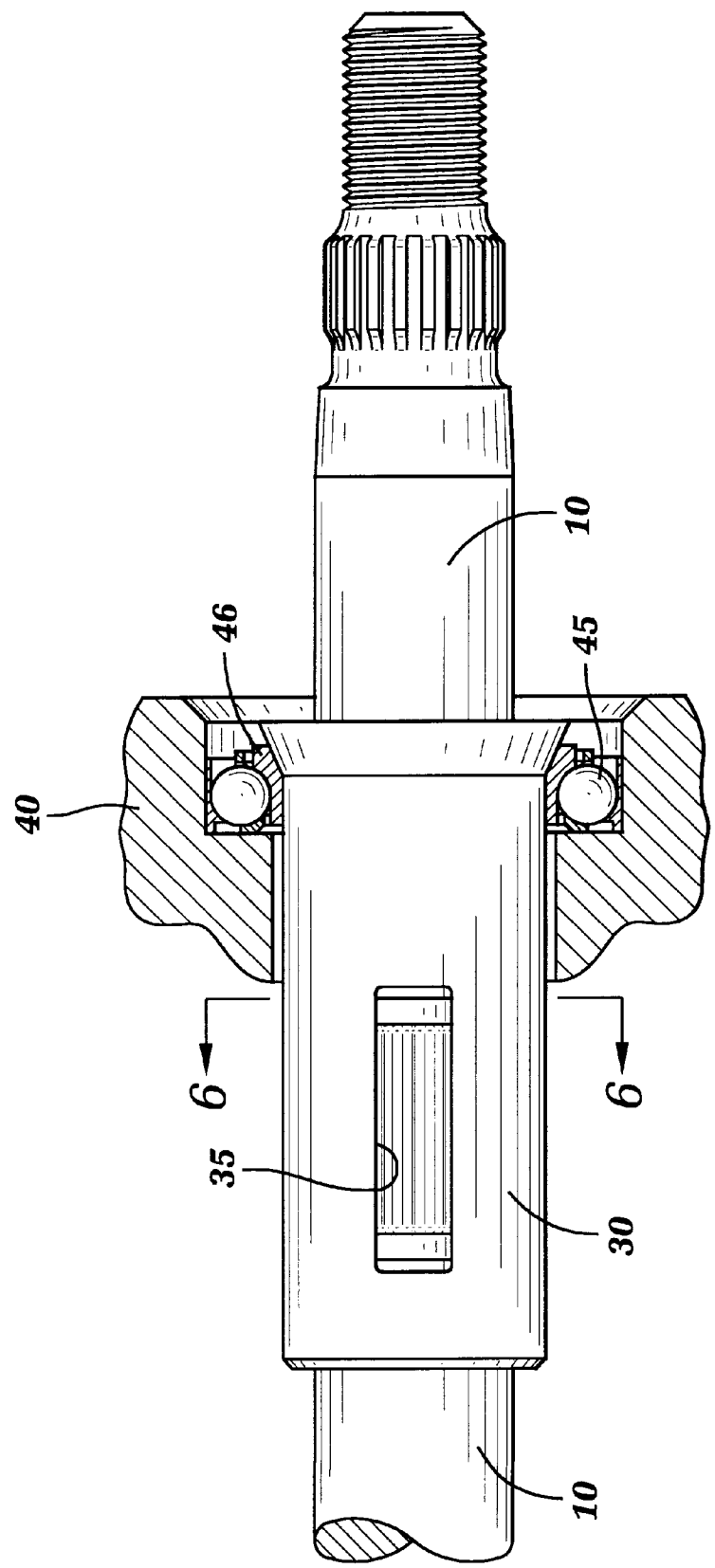
FIG. 3 is a fragmentary longitudinal schematic partially sectional view showing further details of a steering shaft incorporating features of the invention.
Figure 4:
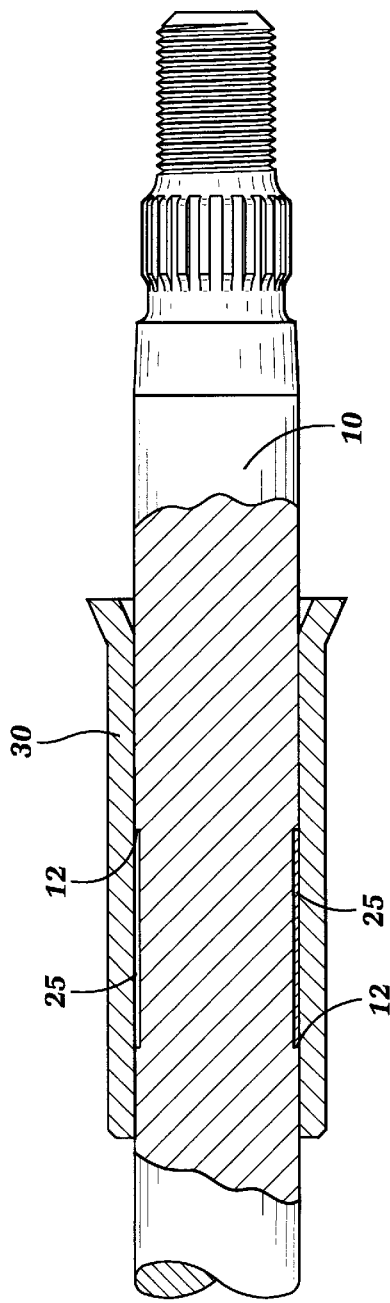
FIG. 4 is a schematic longitudinal sectional view of the steering column shaft and sleeve of FIG. 4.
Figure 6:
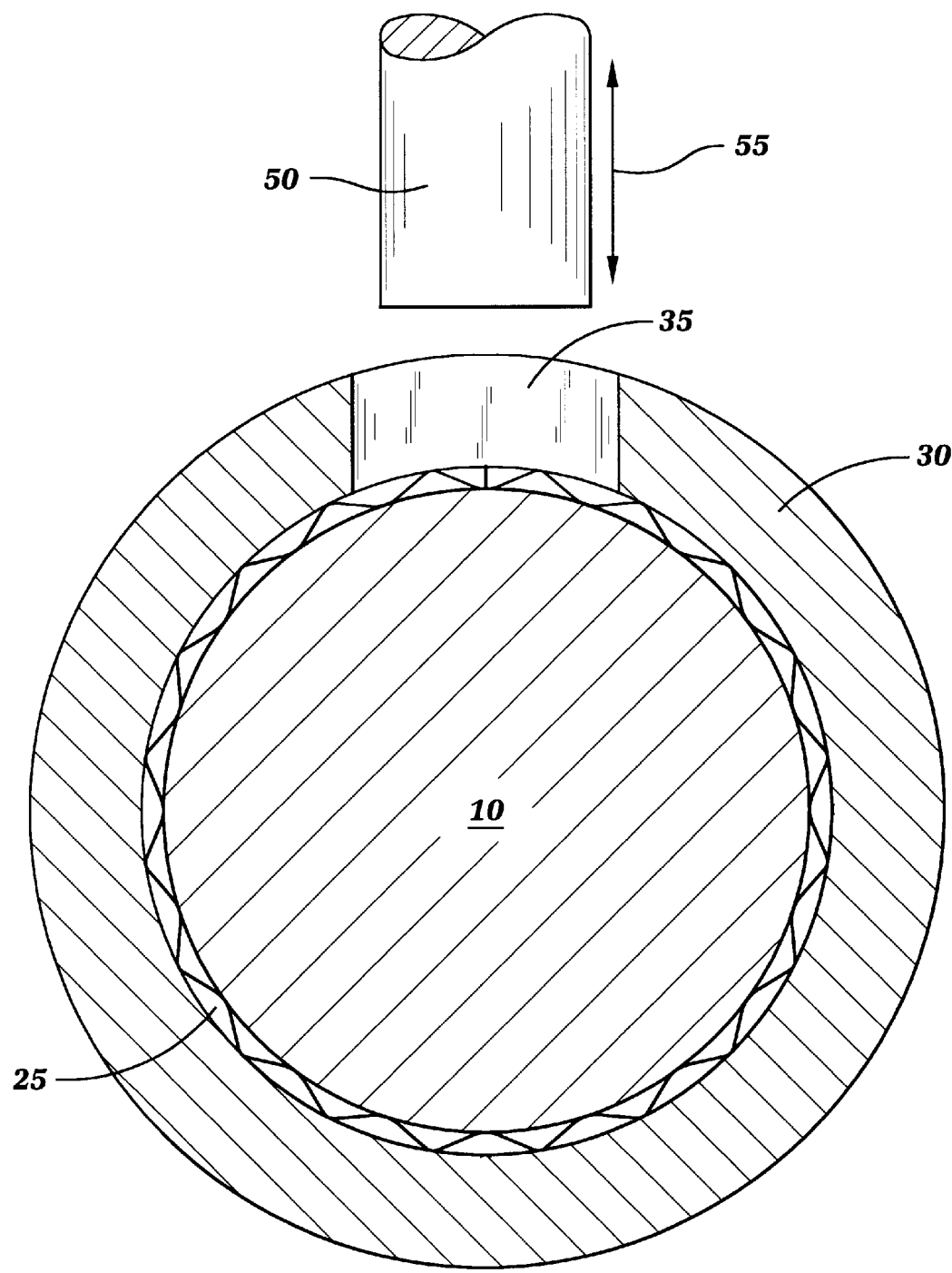
FIG. 6 is a fragmentary transverse sectional view, taken along line 6—6 of FIG. 3, illustrating the key operating features of the invention.

In FIGS. 2 and 3, a hollow cylindrical sleeve member 30 is engaged with the steering column shaft 10 within the steering column housing 40 and is preferably supported in the inner race 46 of a bearing 45 mounted in the steering column housing 40. This arrangement applies to antifriction bearings such as roller or ball bearings. Single element bearings or bushings would fit directly over the sleeve member 30. A locking slot 35 extends axially along the sleeve member and provides a recess into which a locking pin 50 can enter to prevent rotation of the cylindrical sleeve member 30, as shown in FIGS. 3 and 6. The locking pin 50 is operated by an ignition switch 55, mounted to the steering column housing 40, in a manner shown in the Figs. and well known in the art.

To prevent damage to the steering column shaft 10 and other components and linkages connected to the steering column shaft 10 due to forcing the steering wheel when the locking pin 50 is in the locking slot 35, a torque limiting device 25 is interposed between the smooth outer periphery of the steering column shaft 10 and the smooth inner surface of the sleeve member 30. This torque limiting device 25 tightly couples the steering column shaft 10 and the cylindrical sleeve member 30. The torque limiting device is preferably a metal bushing with longitudinal corrugations on at least a portion of its wall, although it could be made of other materials such as polymeric materials if the application permits. It grips sufficiently during routine vehicle operation to lock the steering column shaft 10 when the lock pin 50 is engaged. During assembly, the cylindrical sleeve member 30 is pressed over the bushing 25, which is elastically compressed between the smooth outer surface of the steering column shaft 10 and the smooth inner surface of the cylindrical sleeve member. This provides very firm frictional gripping between the two members, but they are still capable of relative rotational slip, without damage, when sufficient torque is applied to overcome the frictional coupling while the locking pin is engaged.

Figure 5B:
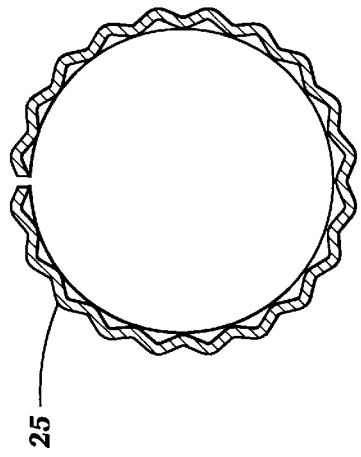
FIGS. 5a and 5b are a perspective view and a transverse sectional view, respectively, of the torque limiting device of the invention.
Figure 5A:
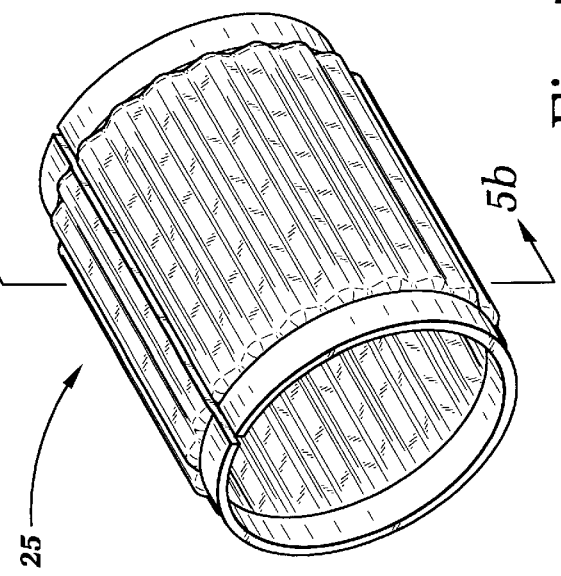

The bushing 25, shown in FIGS. 5a and 5b, is a thin-walled, preferably metal, cylinder with longitudinal corrugations and has a single longitudinal split to permit spreading during installation. It is preferably situated in an undercut portion 12 of the steering column shaft 10 to axially fix the bushing 25 on the shaft 10. The depth of the undercut 12 is preferably equal to the thickness of the bushing material such that only the corrugations of the bushing project beyond the shaft surface to engage the sleeve member.

When the steering wheel is forced with the lock pin 50 engaged in the locking slot 35, the steering column shaft 10 can slip within the sleeve 30, because the torque limiting device, or bushing 25, limits the effective torque between the steering column shaft 10 and the sleeve member 30. Because of the smooth inner and outer surfaces, respectively, of the sleeve member and the shaft; there is no significant damage to the bushing or the shaft and sleeve associated with such slip.

Although the steering wheel can be turned when the lock is engaged, the high-friction grip makes steering very difficult; because the grip of the torque limiting device 25 remains high and relatively constant even when it has yielded to an over-limit torque. This provides the desired protection against theft by increasing the difficulty of forcing of the steering wheel when locked, since for all practical purposes, the vehicle can not be driven due to the very high torque required for such forced steering. At the same time, the steering mechanism is protected from damage because of the friction coupling.

Having described the invention, I claim:

1. An apparatus for locking a steering column shaft rotatably mounted in a steering column housing, comprising:
   a hollow cylindrical sleeve member with a smooth inner surface adapted for overlying a portion of said steering column shaft which has a smooth outer surface;
   a longitudinal slot in an outer surface of said cylindrical sleeve member for receiving a locking pin member from said steering column housing; and
   a cylindrical bushing having longitudinal corrugations in at least a portion of its wall, said bushing being interposed between the outer surface of said steering column shaft and the inner surface of said cylindrical sleeve member for frictionally coupling said sleeve member and said shaft, such that relative rotation between said shaft and said sleeve is possible above a limit torque value and not possible below said limit torque value.

2. The apparatus of claim 1, further comprising:
   a portion of said steering column shaft having a slight undercut for axially positioning said longitudinally corrugated bushing.

3. The apparatus of claim 1, wherein the bushing comprises a thin metal cylinder.

4. The apparatus of claim 2, wherein the bushing comprises a thin metal cylinder.

5. The apparatus of claim 2, wherein the undercut in said steering column shaft has a depth equal to the thickness of the of the non-corrugated portion of the bushing wall so that only the corrugated portion of said bushing protrudes beyond the uncut surface of the steering column shaft.

6. The apparatus of claim 4, wherein the undercut in said steering column shaft has a depth equal to the thickness of the metal of the bushing so that only the corrugated portion of said bushing protrudes beyond the uncut surface of the steering column shaft.

7. An apparatus for providing bearing support and for locking a steering column shaft, comprising:
   a hollow cylindrical sleeve member with a smooth inner surface supported in a bearing and adapted for overlying a portion of said steering column shaft which has a smooth outer surface;
   a longitudinal slot in an outer surface of said cylindrical sleeve member for receiving a locking pin member from said steering column housing; and
   a cylindrical bushing having longitudinal corrugations in at least a portion of its wall, said bushing being interposed between the outer surface of said steering column shaft and the inner surface of said cylindrical sleeve member for frictionally coupling said sleeve member and said shaft, such that relative rotation between said shaft and said sleeve is possible above a limit torque value and not possible below said limit torque value.

8. A steering column having a steering column housing including an apparatus for providing bearing support and for locking a steering column shaft, said apparatus comprising:
   a hollow cylindrical sleeve member with a smooth inner surface supported in a bearing and adapted for overlying a portion of said steering column shaft which has a smooth outer surface;
   a longitudinal slot in an outer surface of said cylindrical sleeve member for receiving a locking pin member from said steering column housing; and
   a cylindrical bushing having longitudinal corrugations in at least a portion of its wall, said bushing being interposed between the outer surface of said steering column shaft and the inner surface of said cylindrical sleeve member for frictionally coupling said sleeve member and said shaft, such that relative rotation between said shaft and said sleeve is possible above a limit torque value and not possible below said limit torque value.

9. A vehicle having a steering column with a steering column housing including an ignition switch and an apparatus for providing bearing support and for locking a steering column shaft, said apparatus comprising:
   a hollow cylindrical sleeve member with a smooth inner surface supported in a bearing and adapted for overlying a portion of said steering column shaft which has a smooth outer surface;
   a longitudinal slot in an outer surface of said cylindrical sleeve member for receiving a locking pin member from said steering column housing; and
   a cylindrical bushing having longitudinal corrugations in at least a portion of its wall, said bushing being interposed between the outer surface of said steering column shaft and the inner surface of said cylindrical sleeve member for frictionally coupling said sleeve member and said shaft and for limiting torque transmitted from said steering column shaft to said sleeve member, such that relative rotation between said shaft and said sleeve is possible above a limit torque value and not possible below said limit torque value.

* * * * *